(12) United States Patent
Albrecht et al.

(10) Patent No.: US 6,738,399 B1
(45) Date of Patent: May 18, 2004

(54) MICROCHANNEL COOLED EDGE CLADDING TO ESTABLISH AN ADIABATIC BOUNDARY CONDITION IN A SLAB LASER

(75) Inventors: Georg F. Albrecht, Livermore, CA (US); Raymond J. Beach, Livermore, CA (US); Richard W. Solarz, Danville, CA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/861,495

(22) Filed: May 17, 2001

(51) Int. Cl.[7] ............... H01S 3/04; H01S 3/113; H01S 3/00
(52) U.S. Cl. ............... 372/35; 372/11; 372/33
(58) Field of Search ............... 372/11, 32, 35, 372/3, 4, 108, 36, 34

(56) References Cited

U.S. PATENT DOCUMENTS

| | | | |
|---|---|---|---|
| 3,445,785 A * | 5/1969 | Koester et al. | 372/40 |
| 3,599,114 A * | 8/1971 | Snitzer et al. | 372/40 |
| 4,760,578 A | 7/1988 | Oshima et al. | |
| 4,789,988 A | 12/1988 | Trost | |
| 4,791,634 A | 12/1988 | Miyake | |
| 4,807,238 A | 2/1989 | Yokomori | |
| 4,845,721 A | 7/1989 | Hoffmann | |
| 4,849,036 A * | 7/1989 | Powell et al. | 156/99 |
| 4,881,233 A * | 11/1989 | von Arb et al. | 372/35 |
| 4,881,237 A | 11/1989 | Donnelly | |
| 5,335,237 A * | 8/1994 | Zapata | 372/33 |
| 5,495,490 A * | 2/1996 | Rice et al. | 372/34 |
| 5,526,372 A | 6/1996 | Albrecht et al. | |
| 5,548,605 A | 8/1996 | Benett et al. | |
| 5,689,523 A * | 11/1997 | Seguin | 372/82 |
| 5,828,683 A * | 10/1998 | Freitas | 372/108 |
| 5,974,061 A | 10/1999 | Byren et al. | |
| 5,991,315 A * | 11/1999 | Injeyan et al. | 372/11 |
| 6,014,391 A * | 1/2000 | Byren | 372/34 |
| 6,055,260 A | 4/2000 | Byren et al. | |
| 6,195,372 B1 * | 2/2001 | Brown | 372/34 |
| 6,310,900 B1 * | 10/2001 | Stephens et al. | 372/36 |
| 2003/0063884 A1 * | 4/2003 | Smith et al. | 385/129 |

* cited by examiner

Primary Examiner—Paul Ip
Assistant Examiner—Hung T Vy
(74) Attorney, Agent, or Firm—William C. Daubenspeck; Paul A. Gottlieb

(57) ABSTRACT

The present invention provides an edge cladding for a slab laser, the edge cladding comprising a cooling channel system therein.

8 Claims, 3 Drawing Sheets

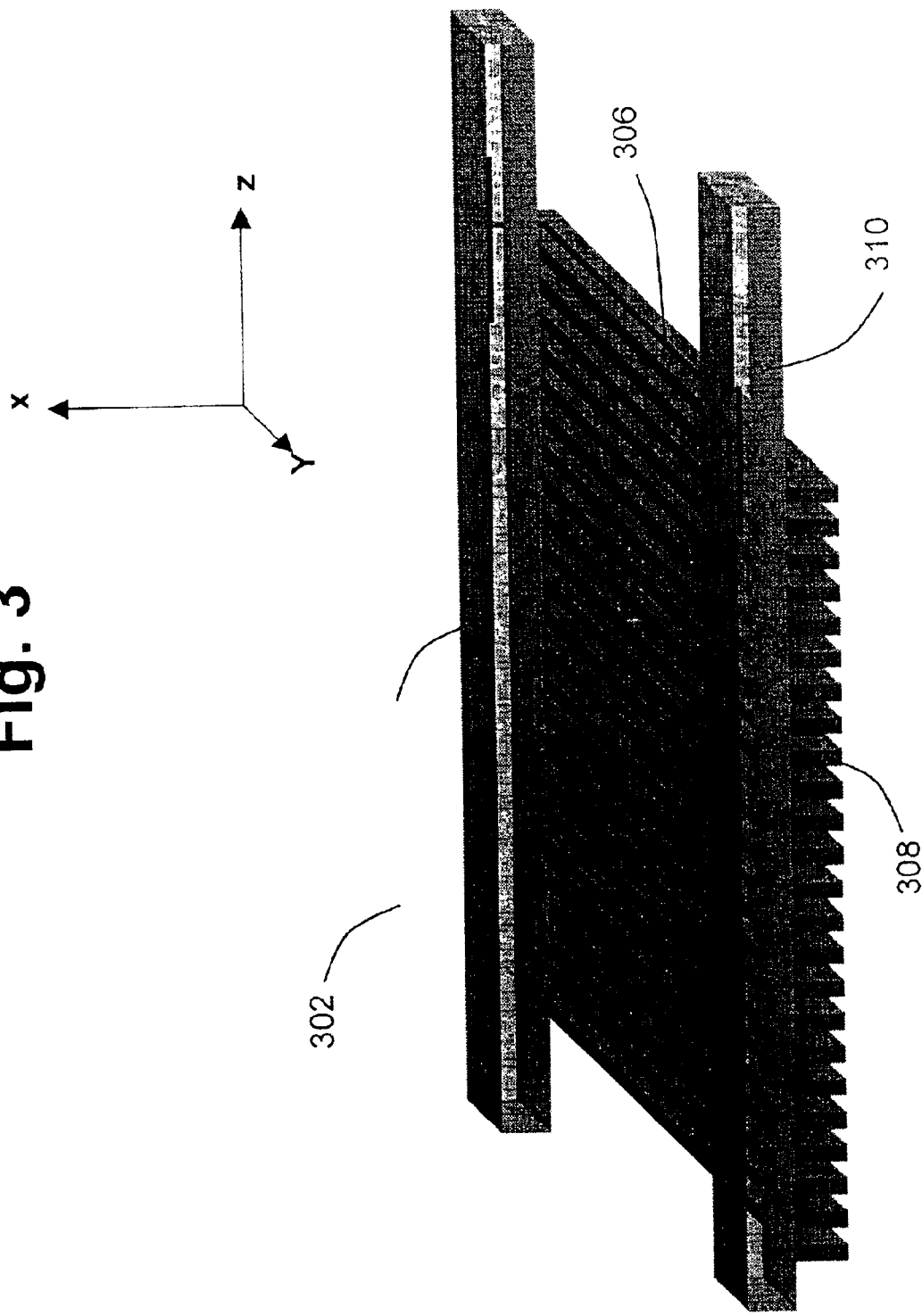

MICROCHANNEL COOLED EDGE CLADDING TO ESTABLISH AN ADIABATIC BOUNDARY CONDITION IN A SLAB LASER

GOVERNMENT INTEREST STATEMENT

The United States Government has rights in this invention pursuant to Contract No. W-7405-ENG-48 between the University of California for the management and operation of the Lawrence Livermore National Laboratory.

BACKGROUND OF THE INVENTION

1. Field of the Invention

The present invention relates to cooling systems for slab lasers.

2. Description of the Prior Art

Solid-state laser technology is a very well developed field and numerous embodiments and modes of operation have been demonstrated. Examples of slab lasers are described in U.S. Pat. Nos. 4,719,639 and 4,939,738, the entire contents and disclosures of which are hereby incorporated by reference.

A more recent development of slab lasers has been the pumping of a solid-state laser active medium with an array of diode lasers (diode pumping, for short). These diode pump packages have previously been developed to pump solid-state lasers with good efficiency, but low average power. Developments at Lawrence Livermore National Laboratory (LLNL), particularly with respect to diode cooler technology, have extended diode pumping to the regime of high average power operation.

In order to achieve high-energy storage densities in a solid-state laser, feedback of amplified spontaneous emission (ASE), and parasitic oscillations within the medium (parasitics), must be efficiently suppressed. To this end, edge claddings have been developed and successfully demonstrated on single shot glass disk amplifiers as described by Linford et al. in "Laser Amplifier Development" in *laser Program Annual Report*, pp. 2–127 to 2–149 (1977) and by Powell et al in "Polymer Edge Claddings" in *Laser Program Annual Report*, pp. 6–22 to 6–30 (1985), the entire contents and disclosures of which are hereby incorporate by reference. Two principal techniques for making edge claddings have been used. One technique has been to use an absorbing medium with the same refractive index as the laser medium and diffusion bond the absorbing medium to the laser disk, as described by Linford et al. above. This brings the absorber material and the lasing material in such intimate contact, that the result is the equivalent of a single monolithic block of material. This technique is commonly referred to as a diffusion bonding technique. The other technique is to use a suitably doped absorber and bond the absorber to the laser disk with a type of glue, where the bonding material index matches with the laser disk, as described in Powell et al. above. This is a much more conventional bond where two different materials are now glued together with a distinct glue layer, itself made of a different material than either the absorber or the laser disk. This technique is commonly referred to as a gluing technique.

The amount of ASE light can be a substantial portion of the inversion energy created in the active medium disk or slab. As the edge cladding absorbs ASE light, it is converted into heat. For single shot devices the resulting sudden temperature rise can be sufficient to "pop off" the edge cladding if the heat is not distributed over a sufficiently large volume of edge cladding material. In average power laser devices there is now a continuous generation of heat in the edge cladding. As the laser power increases, the power density [$W/cm^2$] of this heat generated in the edge cladding can lead to the destruction of the cladding unless sufficient cooling is provided.

SUMMARY OF THE INVENTION

It is a general object of the present invention to provide a cooling system for slab laser edge claddings, which will overcome the above limitations and disadvantages.

It is a further object of the invention to provide cooling system for slab laser edge claddings, which eliminate thermal problems such as focusing and depolarization so that scaling to high average power becomes possible.

It is yet a further object of the present invention to provide a method of cooling the edge cladding of a slab laser which not only removes the heat generated there, but removes it in such a controlled fashion, that an isothermal boundary condition is created which minimizes, and, under ideal conditions, eliminates edge cladding induced stress distortions in the slab/disk itself.

According to a broad aspect of the present invention, there is provided an edge cladding for a slab laser, the edge cladding comprising a cooling channel system therein.

Other objects and features of the present invention will be apparent from the following detailed description of the preferred embodiment.

BRIEF DESCRIPTION OF THE DRAWINGS

The invention will be described in conjunction with the accompanying drawings, in which:

FIG. 3 is a schematic illustration of a section of a cooling channel and plenum arrangement for an edge cladding of the present invention.

DETAILED DESCRIPTION OF THE PREFERRED EMBODIMENT

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "average power slab laser" refers to a solid-state laser of rectangular geometry where the cooling takes place across the thin dimension and heat is removed from the large surfaces.

For the purposes of the present invention, the term "cooling channel" refers to both millichannels and microchannels through which the coolant flows, which transports ASE generated heat towards its rejection to ambient.

For the purposes of the present invention, the term "millichannel" refers to a cooling channel is no more than 5 mm deep and no more than 0.5 mm wide.

For the purposes of the present invention, the term "microchannel" refers to a cooling channel that is no more than 200 microns deep and no more than 10 microns wide.

For the purposes of the present invention, the term "cooling channel system" refers to a plurality of cooling channels forming the cooling system for a slab laser.

For the purposes of the present invention, the term "viscous boundary layer" refers to the conventional meaning of this term in fluid dynamics and thermodynamics. For example, Chapter 7, "Boundary Layer Flows" in *Fluid Mechanics* by Frank White, McGraw, 1986 and Chapter 5–6, "The thermal boundary layer" in *Heat Transfer* by J. P. Holman, 6thnd Ed., (McGraw-Hill, 1986), the entire disclosure and contents of which is hereby incorporated by reference, describes how the viscous boundary layer, referred to as "the boundary layer", of a fluid may be calculated. In general terms, the viscous boundary layer refers to the region of a flowing fluid where the viscous forces due to a wall, such as the wall of a channel, are felt in the flow.

For the purposes of the present invention, the term "thermal boundary layer" refers to the conventional meaning of this term in fluid dynamics and thermodynamics. For example, Chapter 5–6, "The thermal boundary layer" in *Heat Transfer* by J. P. Holman, 6thnd Ed., (McGraw-Hill, 1986), the entire disclosure and contents of which is hereby incorporated by reference, describes how the thermal boundary layer of a fluid may be calculated. In general terms, the thermal boundary layer refers to the region of a flowing fluid where temperature gradients from a heat source adjacent to the flowing fluid are present in the flow.

Description

The present invention provides a method to eliminate beam distortions at the top and bottom of an average power slab laser as the average power slab laser heats up.

Figure 1:
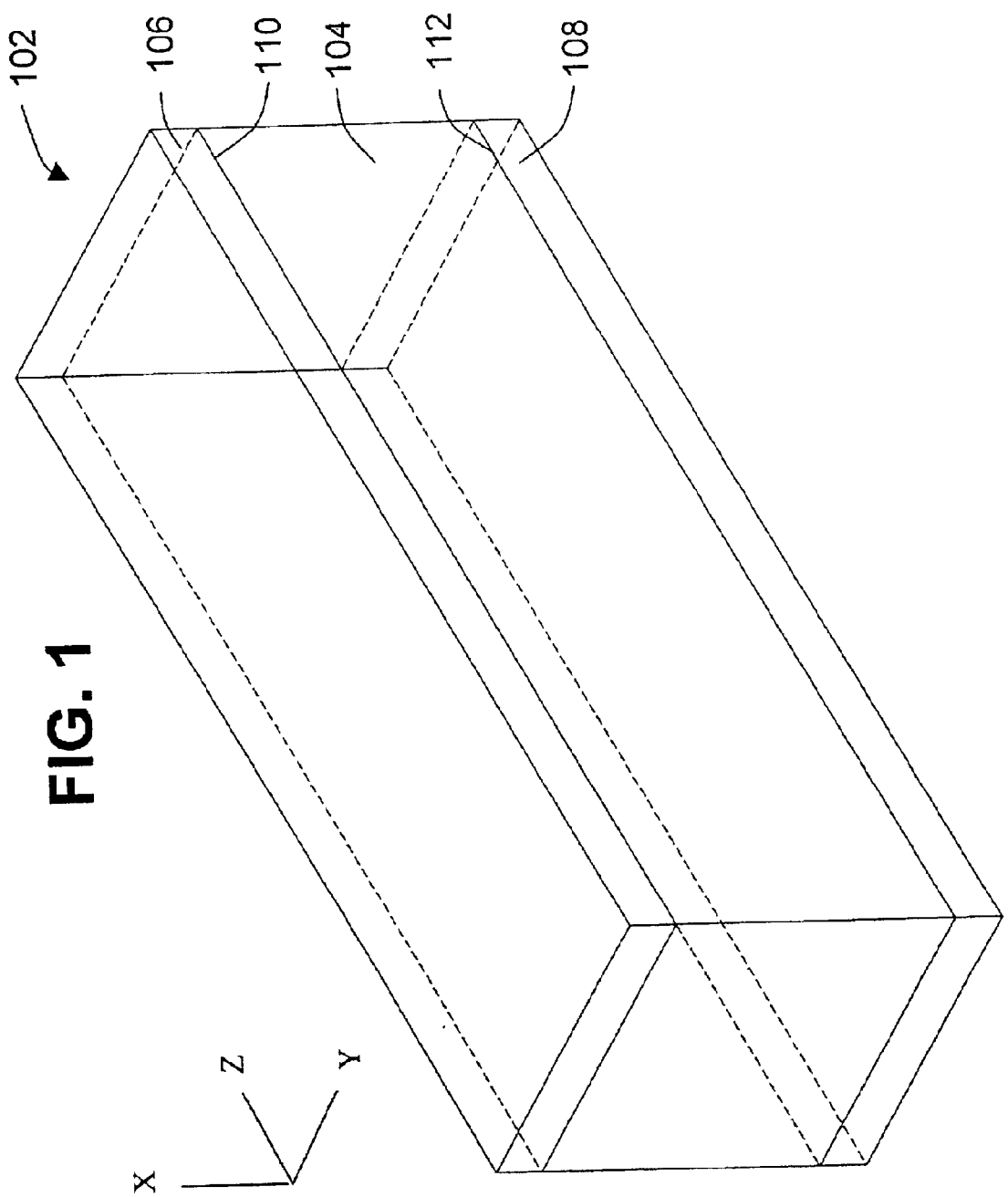
FIG. 1 is a schematic illustration of a slab laser employing the cooling channel system of the present invention.
Figure 2:
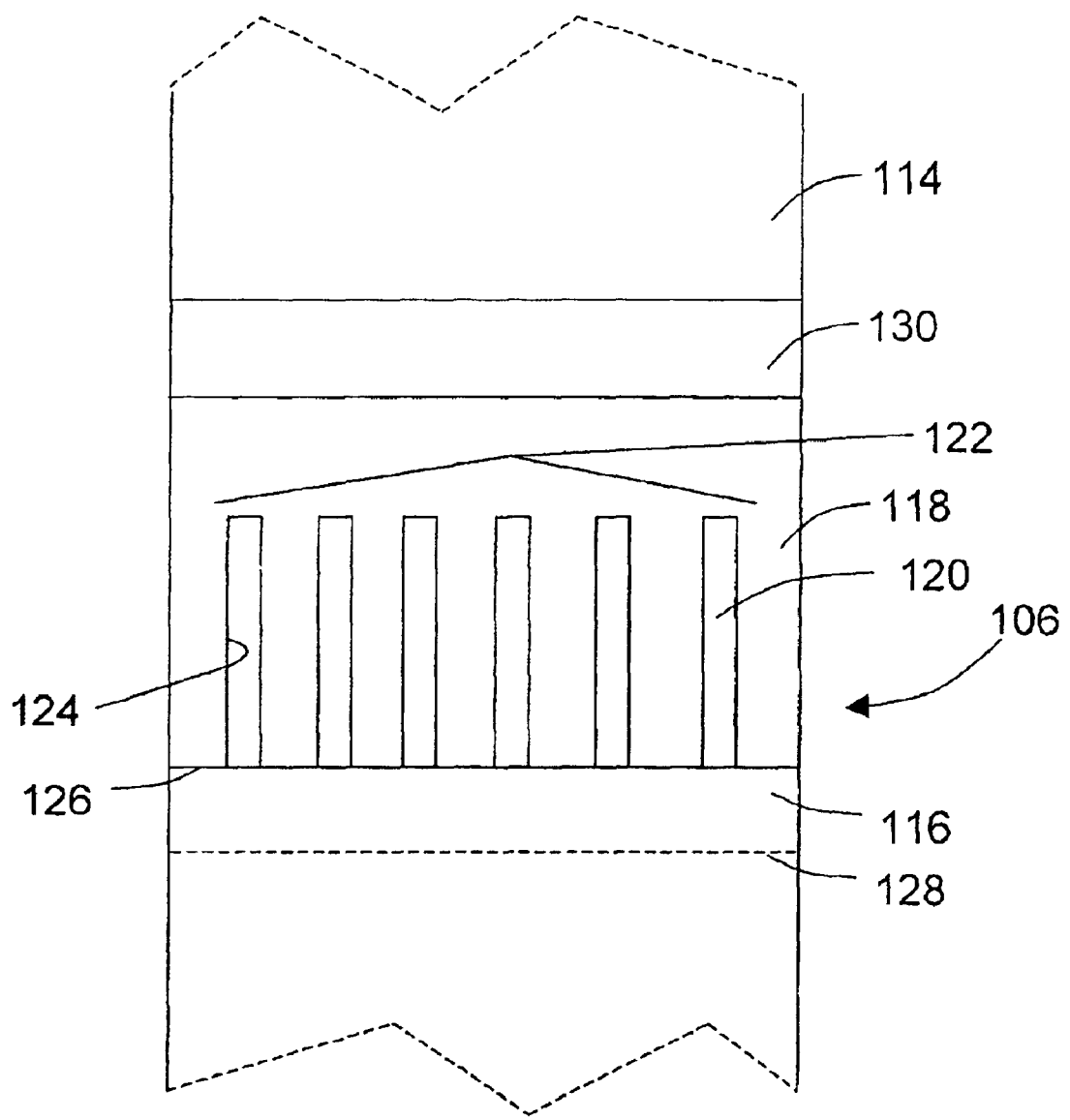
FIG. 2 is a cross-sectional view of the top edge cladding of the slab laser of FIG. 1 attached to a mounting fixture.

FIG. 1 illustrates a preferred embodiment of the present invention in which an average power slab laser 102 including a crystal slab body 104 and a top edge cladding 106 and a bottom edge cladding 108 mounted on crystal slab body 104. Top edge cladding 106 and bottom edge cladding 108 are preferably comprised of an absorber material. Top edge cladding 106 is diffusion bonded to crystal slab body 104 at diffusion bond 110 and bottom edge cladding 108 is diffusion bonded to crystal slab body 104 at diffusion bond 112. FIG. 2 illustrates a portion of a section of top edge cladding 106 mounted to a mounting fixture 114. Top edge cladding 106 includes absorber material 116. Cooling channels 120, which together form a channel cooling system 122, are formed by diffusion bonding heat sink 118, which includes channel grooves 124, to absorber material 116 at diffusion bond 126. In operation a coolant (not shown) is flowed through cooling channels 120. Coolant is preferably flowed through cooling channels 120 so that the parabolic temperature profile in the y-direction of average power slab laser 102 is reproduced in the temperature distribution of the coolant flow. Cooling channel system 122 creates an isothermal condition at boundary 128 for any heat flux produced in average power slab laser 102 in the y-direction. Top edge cladding 106 is attached by a conventional elastic bond 130 to external mounting fixture 114. Although bottom edge cladding 108 is not shown in detail in FIG. 2, bottom edge cladding 108 has essentially the same configuration as top edge cladding 106, except bottom edge cladding 108 is oriented in the opposite direction to top edge cladding 106.

FIG. 3 illustrates a section of a channel cooling system 302 of an edge cladding (not shown) of the present invention mounted on a slab (not shown). Inlet plenum 304 supply cooling channel liquid 306 to cooling channels 308. Cooling channel liquid 306 from cooling channels 308 is taken away by outlet plenums 310. Although for convenience of illustration, only a few cooling channels 308 and only part of inlet plenum 304 and outlet plenum 310 are shown in FIG. 3, in an edge cladding of the present invention there would be generally be many more cooling channels 308 than shown in FIG. 3.

Although for convenience of illustration, only cooling liquid is shown as filling only one cooling channel and only a portion of the inlet and outlet plenums of FIG. 3, the cooling liquid would generally fill all of the channels of the edge cladding of the present invention and be carried along the length of the inlet and outlet plenums.

The power fluxes in the edge cladding of an average power slab laser are generally moderate compared to the capability of the cooling channels of the present invention to cool the edge cladding, the cooling channels of the present invention. Therefore, even relatively simply designed cooling channels may be effective in cooling the edge cladding of an average power slab laser.

Depending on the specific laser design, the dimensions of the cooling channels of the present invention are millichannels that are each no more than about 5 mm deep and no more than about 0.5 mm wide. Or, the cooling channels of the present invention may be microchannels that are each no more than about 200 microns deep and no more than about 10 microns wide.

From a functional standpoint, the cooling channels of the present invention have a width no greater than a fraction of the thickness of the thermal boundary layer, of the liquid that is flowed through the cooling channels. More preferably, the width of the cooling channels of the present invention are no greater than 20% of the thickness of the thermal boundary layer, of the liquid that is flowed through the cooling channels. Even more preferably the cooling channels are no greater than 20% of the thickness of the thinner of the viscous boundary layer and the thermal boundary layer.

The slab body of the slab lasers of the present invention can be made of any of the known solid-state laser materials, which can be pumped in a slab laser configuration. Of these, the following materials would be most suited for average power generation requiring a capable edge cladding: neodymium yttrium aluminum garnet (Nd:YAG); and neodymium gadolinium gallium garnet (Nd:GGG). Although only specific slab body materials are mentioned above, it is to be understood, that the present invention relates to the cooling of any solid-state slab laser.

The cooling channel system of the present invention is particularly useful in providing an isothermal edge cladding to slab lasers employing birefringent crystals. Although the cooling channel system of the present invention may eliminate beam distortion due to thermal effects, stress effects originating within the cooling channels may be expected to be visible through beam depolarization near the top and bottom of the slab body, if the crystal of the slab body is isotropic. Therefore, in isotropic crystals, regions near the bottom of the slab body may depolarize the beam. In contrast, anisotropic crystals such as yttrium ortho silicate (YOS) are known to be immune to depolarization by external mechanical or thermo-mechanical effects. Therefore, when the slab body of the slab laser is an anisotropic crystal, the present invention allows full, unrestricted use of the beam across the entire aperture of the crystal in the slab laser. In laser systems in which efficiency is at a premium, this is an extremely useful feature of tab slab lasers employing the cooling channel system of the present invention.

A preferred material for the absorber of the edge cladding of the present invention is an absorber material for absorbing light at the wavelength or wavelengths emitted by laser on which the edge cladding of the present invention is mounted. Typically this is made of the same material as the slab body, but is doped to make the edge cladding into an absorber. One preferred absorbing material is copper doped garnet but other conventional absorbing materials for slab lasers may be used.

Preferably the refractive index of the absorber material matched with the refractive index bulk slab material of the edge clad laser of the present invention to avoid Fresnel reflection feedback from the interface between the edge cladding and the slab, back into the slab. Therefore the edge cladding of the present invention is preferably made from a similar quite similar material as the bulk slab on which the edge cladding is mounted, but doped with an absorber ion.

A preferred method of forming the cooling channels of the present invention is to etch grooves in a silicon substrate either by conventional chemical etching techniques, such as etching, or by suitable physical etching techniques, such as using a micro-saw to form grooves in the silicon substrate. Once the grooves are formed, the microchannels are formed by diffusion bonding the etched silicon substrate to the absorbing materials to close the grooves and form cooling channels. Suitable techniques for forming the microchannels of the present invention are described in U.S. Pat. Nos. 5,548,605 and 5,828,683, the entire contents and disclosure of which are hereby incorporated by reference.

A preferred coolant for flowing through the cooling channels of the present invention is water due to water's relatively low viscosity and relatively high heat capacity.

The present invention all for the temperature distribution through a slab laser to be made identical to the temperature distribution across the cooling channel system of the present invention, thereby creating an isothermal condition for the heat flux in the y-direction. Because of the isothermal condition so created, the temperature contours in the average power slab laser continue uninterrupted and linearly through top and bottom of the average temperature slab laser and into the cooling channel system. Thus, the cooling channel system of the present invention eliminates beam distortion effects, which were associated with temperature contours that have previously curved near the slab body top and bottom in conventional slab lasers.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. In a solid-state slab laser of the type having a crystal slab body of laser medium, said slab laser medium having an edge cladding of the type wherein a layer of absorber material, having a refractive index matched to the refractive index of the laser medium, is diffusion bonded to the top surface and bottom surface of said crystal slab body of laser medium to suppress amplified spontaneous emission (ASE) and parasitic oscillations within the laser medium, the improvement being a cooling system added to said edge cladding to eliminate beam distortions at the top and the bottom of the slab laser as the laser heats up comprising:

(a) a first heat sink diffusion bonded to the top surface of layer of absorber material, said first heat sink having cooling channels to allow a cooling liquid to flow through said cooling channels to create an isothermal condition at the interface between the laser medium and the top edge cladding; and (b) a second heat sink diffusion bonded to the surface of said bottom edge cladding opposite the surface of the bottom edge cladding that is diffusion bonded to said laser medium, said second heat sink having cooling channels to allow a cooling liquid to flow through said cooling channels to create an isothermal condition at the interface between the laser medium and the bottom edge cladding.

2. The cooling system of claim 1 wherein said first and second heat sinks are made from the same material as said absorber layers.

3. The cooling system of claim 1 wherein said cooling channels comprise a plurality of cooling channels that are each no more than about 5 mm deep and no more than about 0.5 mm wide.

4. The cooling system of claim 1 wherein said cooling channels comprise a plurality of cooling channels that are each no more than about 200 microns deep and no more than about 10 microns wide.

5. The cooling system of claim 1 wherein each of said channels has a width no great than the thickness of the thermal boundary layer of said coolant flowing through said cooling channel system.

6. The cooling system of claim 1 wherein each of said channels has a width no great than 20% of the thickness the thermal boundary layer of said coolant flowing through said cooling channel system.

7. The cooling system of claim 1 wherein the absorber material is the same material as the slab body but is doped to make the edge cladding into an absorber.

8. The cooling system of claim 7 wherein said first and second heat sinks are made from the same material as said absorber layers.

\* \* \* \* \*